United States Patent
Su

(10) Patent No.: US 8,294,819 B2
(45) Date of Patent: Oct. 23, 2012

(54) DE-INTERLACING APPARATUS AND METHOD AND MOVING CAPTION COMPENSATOR

(75) Inventor: Wei-Chi Su, Tainan (TW)

(73) Assignee: Novatek Microelectronics Corp., Hsinchu (TW)

( * ) Notice: Subject to any disclaimer, the term of this patent is extended or adjusted under 35 U.S.C. 154(b) by 570 days.

(21) Appl. No.: 12/614,486

(22) Filed: Nov. 9, 2009

(65) Prior Publication Data

US 2010/0265393 A1 Oct. 21, 2010

(30) Foreign Application Priority Data

Apr. 15, 2009 (TW) .............................. 98112568 A

(51) Int. Cl.
 *H04N 7/01* (2006.01)
(52) U.S. Cl. ........ 348/452; 348/448; 348/441; 348/451; 348/459; 348/699
(58) Field of Classification Search .................. 348/452, 348/451, 459, 441, 448, 446, 431.1, 699; 382/236; 375/240.16, 240.01
See application file for complete search history.

(56) References Cited

U.S. PATENT DOCUMENTS 8,184,200 B1 * 5/2012 Biswas et al. ................. 348/459
2010/0201883 A1 * 8/2010 Delva et al. ................... 348/607

* cited by examiner

*Primary Examiner* — Jefferey Harold
*Assistant Examiner* — Jean W Desir
(74) *Attorney, Agent, or Firm* — Rabin & Berdo, P.C.

(57) ABSTRACT

A de-interlacing method includes the following steps. A de-interlacing pixel datum of a target pixel is obtained according to a current field and multiple correlated fields. A caption region of the current field is defined according to the fields, and a region motion vector and a region confidence are correspondingly obtained. When the target pixel belongs to the caption region, a compensation pixel datum of the target pixel is obtained by motion compensation according to at least a part of the fields and the region motion vector, and the target pixel is judged as a foreground pixel or a background pixel to output a compensation select signal according to the region motion vector and the region confidence. The de-interlacing pixel datum or the compensation pixel datum is outputted as a correlated pixel datum of the target pixel according to the compensation select signal.

41 Claims, 6 Drawing Sheets

DE-INTERLACING APPARATUS AND METHOD AND MOVING CAPTION COMPENSATOR

This application claims the benefit of Taiwan application Serial No. 98112568, filed Apr. 15, 2009, the subject matter of which is incorporated herein by reference.

BACKGROUND OF THE INVENTION

1. Field of the Invention

The invention relates in general to a de-interlacing apparatus, a de-interlacing method and a moving caption compensator, and more particularly to a de-interlacing apparatus, a de-interlacing method and a moving caption compensator capable of compensating captions.

2. Description of the Related Art

Due to the limitations in the speed of the processor and the bandwidth, a conventional progressive video signal is replaced with an interlaced video signal in the current broadcast television system. However, the current new display apparatus, such as a liquid crystal display (LCD) or a plasma display, only supports the progressive scan, and thus needs to have the de-interlacing function of converting the interlaced video signal into the progressive video signal.

However, the conventional de-interlacer usually de-interlaces the whole image. For example, the whole image is compensated by way of intra-field interpolation, and the motion detection or motion compensation operation is not performed on the moving motion caption in the image. Consequently, because the caption usually accompanies with the high-frequency component, the de-interlacing is still performed by way of intra-field interpolation. Thus, the resolution is reduced, and many poor visual effects, such as flicker, line jitter and non-smoothness, may be caused.

SUMMARY OF THE INVENTION

The invention is directed to a de-interlacing apparatus, a de-interlacing method and a moving caption compensator, wherein multiple correlated fields are adopted to define a caption region, and a correlated pixel datum is obtained by performing motion compensation on the pixels in the caption region.

According to a first aspect of the present invention, a de-interlacing apparatus including a de-interlacer, a moving caption compensator and a multiplexer is provided. The de-interlacer obtains a de-interlacing pixel datum of a target pixel according to a current field and a plurality of correlated fields. The moving caption compensator defines a caption region of the current field according to the fields and correspondingly obtaining a region motion vector and a region confidence. When the target pixel belongs to the caption region, the moving caption compensator obtains a compensation pixel datum of the target pixel by motion compensation according to at least a part of the fields and the region motion vector, and judging the target pixel as a foreground pixel or a background pixel to output a compensation select signal according to the region motion vector and the region confidence. The multiplexer is controlled by the compensation select signal to output the de-interlacing pixel datum or the compensation pixel datum as a correlated pixel datum of the target pixel.

According to a second aspect of the present invention, a moving caption compensator including a caption region defining block, a foreground/background judging block and a motion compensation block is provided. The caption region defining block respectively estimates a motion vector of each of pixels on a plurality of detection lines of a current field and the number of turnover times of pixel gray levels of the detection lines according to the current field and the plurality of correlated fields to determine whether the detection lines are caption lines, and defines a caption region according to the caption lines and correspondingly obtains a region motion vector and a region confidence. The foreground/background judging block judges a target pixel as a foreground pixel or a background pixel to output a compensation select signal according to a motion vector of the target pixel, the region motion vector and the region confidence. When the target pixel belongs to the caption region, the motion compensation block performs motion compensation according to at least a part of the fields and the region motion vector, and judges whether the detection line, to which the target pixel belongs, is a pull-down caption line or not to obtain a compensation pixel datum of the target pixel.

According to a third aspect of the present invention, a de-interlacing method is provided. The method includes the following steps. A de-interlacing pixel datum of a target pixel is obtained according to a current field and a plurality of correlated fields. A caption region of the current field is defined according to the fields and a region motion vector and a region confidence are correspondingly obtained. When the target pixel belongs to the caption region, a compensation pixel datum of the target pixel is obtained by motion compensation according to at least a part of the fields and the region motion vector, and the target pixel is judged as a foreground pixel or a background pixel to output a compensation select signal according to the region motion vector and the region confidence. The de-interlacing pixel datum or the compensation pixel datum is outputted as a correlated pixel datum of the target pixel according to the compensation select signal.

The invention will become apparent from the following detailed description of the preferred but non-limiting embodiments. The following description is made with reference to the accompanying drawings.

DETAILED DESCRIPTION OF THE INVENTION

The invention provides a de-interlacing apparatus, a de-interlacing method and a moving caption compensator. The invention judges whether multiple detection lines are caption lines according to multiple correlated fields, defines a caption region according to the properties of the caption lines, performs motion compensation on the pixels within the caption region, and then obtains a correlated pixel datum according to whether the pixel belongs to a foreground pixel or a background pixel.

Figure 1:
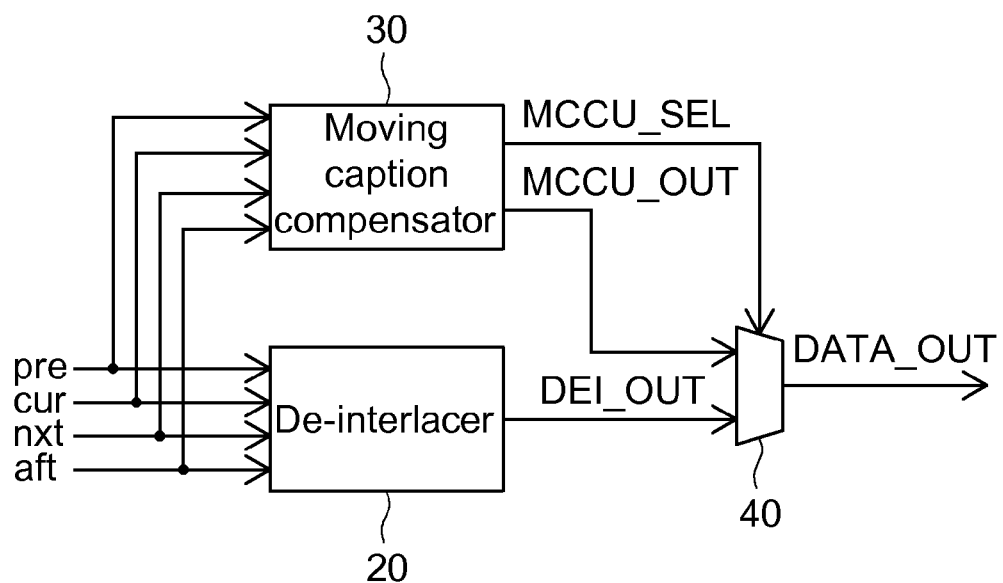
FIG. 1 is a block diagram showing a de-interlacing apparatus according to a preferred embodiment of the invention.

FIG. 1 is a block diagram showing a de-interlacing apparatus 10 according to a preferred embodiment of the invention. In this illustrated embodiment, the de-interlacer operates in conjunction with the moving caption compensator. However, it is to be noted that the moving caption compensator of the invention may operate independently, and the invention is not particularly limited thereto. The de-interlacing apparatus 10 includes a de-interlacer 20, a moving caption compensator 30 and a multiplexer 40. The de-interlacer 20 obtains a de-interlacing pixel datum DEI_OUT of a target pixel according to a current field and multiple correlated fields. In this embodiment, four neighboring fields including a previous field pre, a current field cur, a next field nxt and an after field aft are described as illustrative and non-limitative examples, and the neighboring fields may be decided according to the correlated fields required in the de-interlacing method.

The moving caption compensator 30 defines a caption region of the current field cur according to the fields and obtains a region motion vector and a region confidence corresponding to the caption region. The number of the caption region of the current field defined by the moving caption compensator 30 is not limited to one. Multiple caption regions may be defined in the current field, and the corresponding region motion vector and region confidence may be respectively obtained. The technology of defining the caption region is still regarded as falling within the scope of the invention.

When the target pixel belongs to the caption region, the moving caption compensator 30 obtains a compensation pixel datum MCCU_OUT of the target pixel by motion compensation according to at least a part of the fields and the region motion vector, and judges the target pixel as a foreground pixel or a background pixel to output a compensation select signal MCCU_SEL according to the region motion vector and the region confidence. The multiplexer 40 is controlled by the compensation select signal MCCU_SEL to output the de-interlacing pixel datum DEI_OUT or the compensation pixel datum MCCU_OUT as a correlated pixel datum DATA_OUT of the target pixel.

Figure 2:
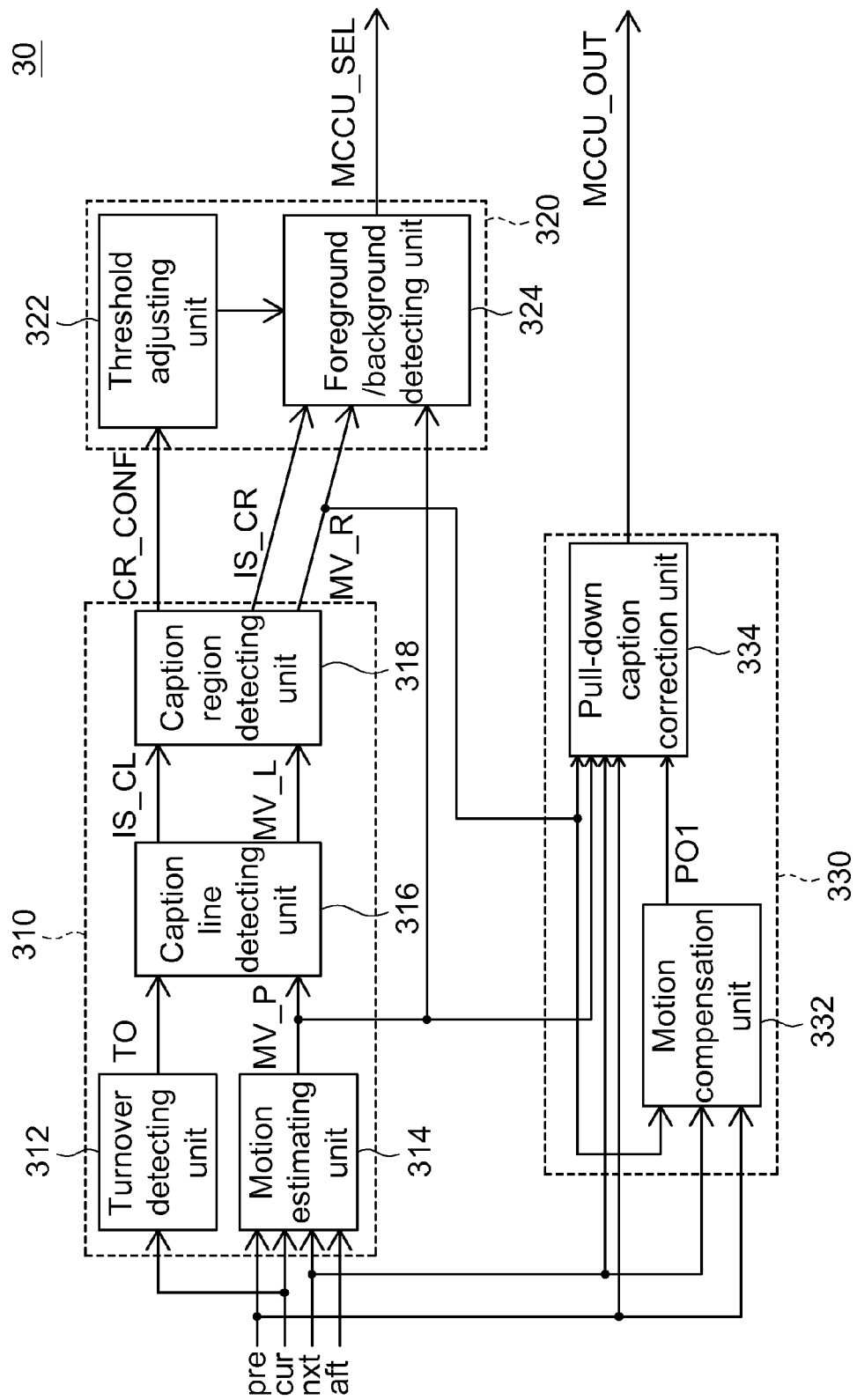
FIG. 2 is a block diagram showing a moving caption compensator according to the preferred embodiment of the invention.

FIG. 2 is a block diagram showing the moving caption compensator 30 according to the preferred embodiment of the invention. Referring to FIG. 2, the moving caption compensator 30 includes a caption region defining block 310, a foreground/background judging block 320 and a motion compensation block 330. The caption region defining block 310 substantially estimates multiple detection lines on the current field cur to determine whether the detection lines are caption lines and the overall motion vector thereof. Each detection line corresponds to a scan line or a data line. That is, the moving caption compensator 30 can perform the motion compensation on the horizontal caption when the detection line corresponds to the scan line, and can also perform the motion compensation on the vertical caption when the detection line corresponds to the data line. Thus, the invention is not particularly limited thereto.

The caption region defining block 310 respectively estimates a motion vector MV_P of each pixels on multiple detection lines of the current field cur and the number of turnover times TO of the pixel gray levels of the detection lines according to the current field cur and the correlated fields pre, nxt and aft. Thereafter, the caption region defining block 310 determines whether the detection line is a caption line or not according to the motion vector MV_P of the pixel and the number of turnover times TO of the pixel gray levels, and defines the caption region according to the properties of the caption line, and obtains the corresponding region motion vector MV_R and region confidence CR_CONF.

The caption region defining block 310 includes a turnover detecting unit 312, a motion estimating unit 314, a caption line detecting unit 316 and a caption region detecting unit 318. The turnover detecting unit 312 detects the number of turnover times TO of the pixel gray levels on the detection lines of the current field cur. If the detection line does not belong to the caption line but belongs to the image, then the gray levels of the pixels on the detection line approach the continuous condition, and the turnover phenomena of the pixel gray levels become fewer. On the contrary, if the detection line belongs to the caption line, then the turnover phenomena of the pixel gray levels become more.

The motion estimating unit 314 respectively estimates the motion vector MV_P of each pixel on the detection lines according to the current field cur and the correlated fields pre, nxt and aft. The motion estimating unit 314 calculates cross differences between pixel gray levels in a plurality of directions within a search window between two parity-fields in the current field cur and the correlated fields pre, nxt and aft with respect to each of pixels on the detection lines, and takes a minimum of the cross differences between the pixel gray levels corresponding to each of the pixels as the motion vector MV_P of the pixel. The minimum of the cross differences of the pixel gray levels may be further restricted to be smaller than a first threshold value.

Figure 3A:
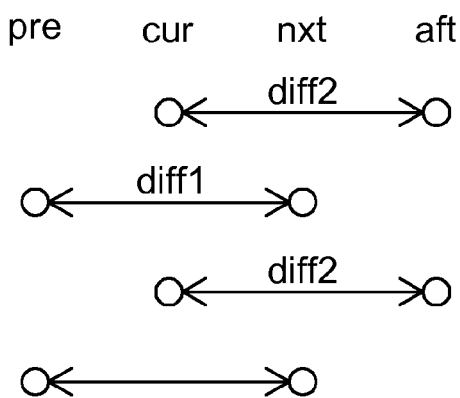
FIGS. 3A and 3B are schematic illustrations showing motion estimating according to the preferred embodiment of the invention.
Figure 3B:
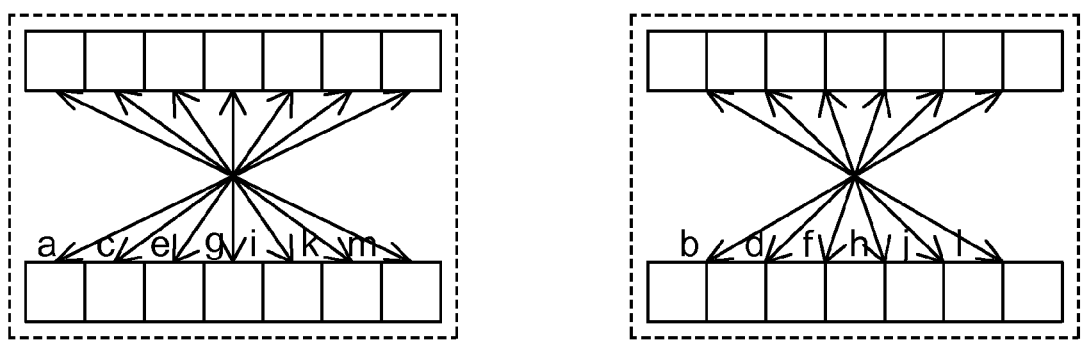

FIGS. 3A and 3B are schematic illustrations showing motion estimating according to the preferred embodiment of the invention. This embodiment is illustrated by taking the previous field pre, the current field cur, the next field nxt and the after field aft as examples, wherein the previous field pre and the next field nxt are a parity-field, and the current field cur and the after field aft are another parity-field. In FIG. 3A, the motion estimating unit 314 calculates the cross difference diff1 between the pixel gray levels of the previous field pre and the next field nxt of the parity-field with respect to the pixel, and the cross difference diff2 between the pixel gray levels of the current field cur and the after field aft.

In addition, the motion estimating unit 314 calculates the cross differences between the pixel gray levels of the two parity-fields on multiple directions within a search window. In the non-limitative example of FIG. 3B, the search window is {−3,+3}. In other examples, the search window may be determined according to the adopted system hardware resource. In FIG. 3B, if the precision is, for example but without limitation to, ½ pixels, then the motion estimating unit 314 may calculate the cross differences between the pixel gray levels in 13 directions a, b, c, . . . , m and l when the search window is {−3,+3}. The cross differences between the pixel gray levels in different directions may be given with different weighting coefficients. The motion estimating unit 314 takes the minimum of the cross differences between the pixel gray levels as the motion vector MV_P of the pixel. The minimum may be limited to be smaller than a first threshold value so that is can serve as the motion vector MV_P.

The caption line detecting unit 316 respectively judges whether the detection line is a caption line and obtains multiple most probable motion vectors MV_L respectively corresponding to the detection lines according to the number of turnover times TO of the pixel gray levels on each detection line and the motion vector MV_P of each pixel on the detection lines. If the detection line belongs to the caption line, then the gray level of the pixel on the detection line tends to have the turnover phenomena of the pixel gray levels more frequently.

Thus, when the number of turnover times TO of the pixel gray levels on the detection line is greater than a second threshold value and a mode of the motion vectors MV_P of all the pixels on the detection line is greater than a third threshold value, then the caption line detecting unit 316 judges the detection line as the caption line, outputs the corresponding detection signal IS_CL as "TRUE", and takes the mode as the most probable motion vector MV_L of the detection line. Because the embodiment substantially performs the compensation with respect to the motion caption, the most probable motion vector MV_L may be further limited to be a non-zero vector. That is, if the main motion vectors of all the pixels on the detection line are zero vectors, then a secondary motion vector has to be adopted as the most probable motion vector MV_L.

The caption region detecting unit 318 defines the caption region and obtains the region confidence CR_CONF of the caption region according to multiple caption lines, and obtains the region motion vector MV_R according to the most probable motion vectors MV_L. The caption region detecting unit 318 may define not only one caption region. The caption region detecting unit 318 obtains the corresponding region motion vector and region confidence with respect to each defined caption region. In addition, the caption region detecting unit 318 sets the corresponding caption line signal IS_CR as "TRUE" with respect to the caption line, and sets the corresponding caption line signal IS_CR as "FALSE" with respect to the non-caption line.

Figure 4A:
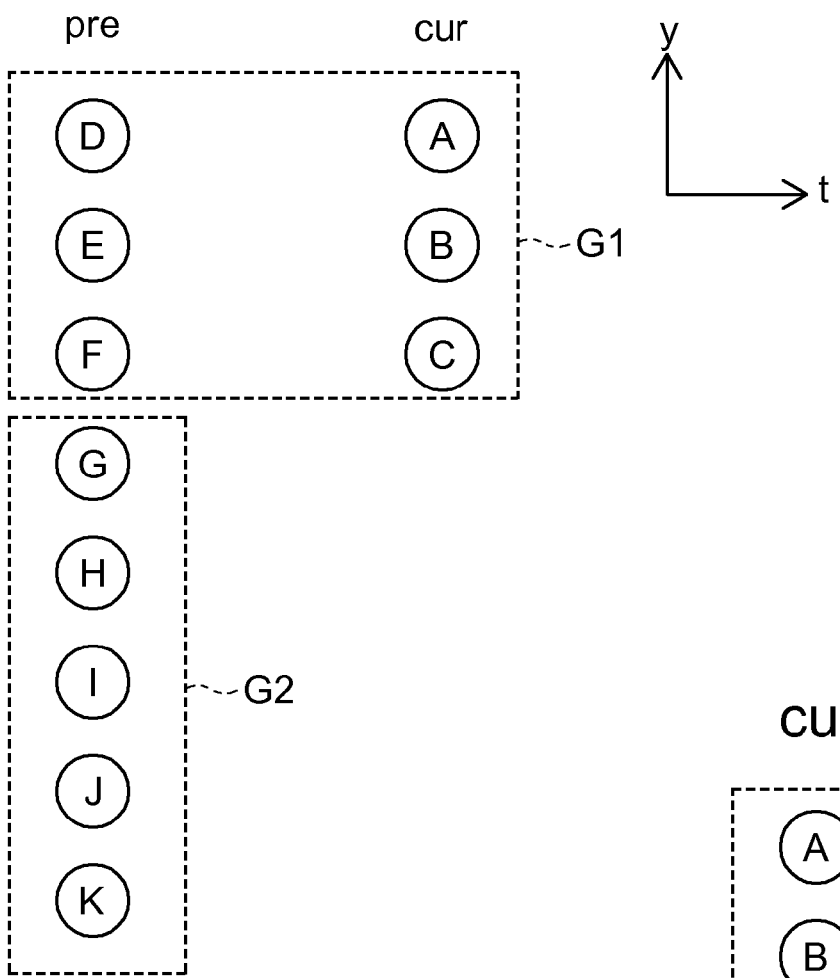
FIG. 4A is a schematic illustration showing an example of the caption region detection according to the preferred embodiment of the invention.

The caption region detecting unit 318 may define the caption region according to multiple caption lines of the current field cur and the previous field pre, and obtains the region motion vector MV_R according to multiple most probable motion vectors MV_L of the caption lines. An illustrative but non-limitative judgement rule for detecting and defining the caption region is provided. FIG. 4A is a schematic illustration showing an example of the caption region detection according to the preferred embodiment of the invention. In FIG. 4A, symbols A, B and C represents the detection lines of the current field cur, and symbols D, E, . . . , J and K represents the detection line of the previous field pre. The detection lines A to F are set as a first group G1, and the detection lines G to K are set as a second group G2. The first group G1 has the higher judgement priority than that of the second group G2.

In the first group G1, if any two of the detection lines A to C have the same most probable motion vector MV_L1, any two of the detection lines D to F have the same most probable motion vector MV_L2, and MV_L1 is equal to MV_L2, then the most probable motion vector MV_L1 is the region motion vector MV_R. Alternatively, if three detection lines A to C have the same most probable motion vector MV_L1, then the most probable motion vector MV_L1 is the region motion vector MV_R. Alternatively, if three detection lines D to F have the same most probable motion vector MV_L2, then the most probable motion vector MV_L2 is the region motion vector MV_R.

If the judgement conditions of the first group G1 fail, then it is checked any three of the detection lines G to K have the same most probable motion vector MV_L3 in the second group G2, and the most probable motion vector MV_L3 is the region motion vector MV_R. Alternatively, if the two detection lines J and K have the same most probable motion vector MV_L4, then the most probable motion vector MV_L4 is the region motion vector MV_R.

Figure 4B:
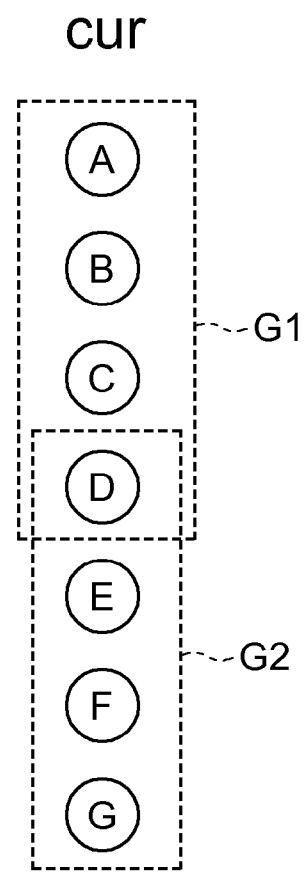
FIG. 4B is a schematic illustration showing another example of the caption region detection according to the preferred embodiment of the invention.

However, the caption region detecting unit 318 may also only define the caption region and obtains the region motion vector MV_R according to multiple caption lines of the current field cur. So, the invention is not particularly limited thereto. FIG. 4B is a schematic illustration showing another example of the caption region detection according to the preferred embodiment of the invention. In FIG. 4B, symbols A, B, . . . , F and G represent the detection lines of the current field cur. The detection lines A to D are set as the first group G1, and the detection lines D to G are set as the second group G2. In the first group G1, if any three of the detection lines A to D have the same most probable motion vector MV_L3, then the most probable motion vector MV_L3 is the region motion vector MV_R. Alternatively, if any two of the detection lines A to C have the same most probable motion vector MV_L4, then the most probable motion vector MV_L4 is the region motion vector MV_R. Similarly, the rules may also be applied to the second group G2.

In the preferred embodiment of the invention, it is to be noted that the single caption region is a group consisting of multiple neighboring detection lines substantially having the similar motion vectors, and not all the detection lines in the caption region are caption lines, and not all the detection lines in the caption region have the same most probable motion vector.

The caption region detecting unit 318 also obtains the region confidence CR_CONF of the caption region according to the number of pixels having the most probable motion vectors MV_L on the detection lines in the caption region. If the number of pixels having the most probable motion vectors MV_L on a single detection line reaches a predetermined number, then the detection line is regarded as a true caption line. The caption region detecting unit 318 determines the region confidence CR_CONF according to the ratio of the number of true caption lines to the number of all the caption lines. The region confidence CR_CONF becomes higher when the number of true caption lines gets higher. The region confidence CR_CONF ranges from 0 to 3, for example.

The foreground/background judging block 320 judges the target pixel as the foreground pixel or the background pixel (for instance, caption as foreground and non-caption as background) to output a compensation select signal according to the motion vector MV_P of the target pixel, the region motion vector MV_R and the region confidence CR_CONF. The foreground/background judging block 320 includes a threshold adjusting unit 322 and a foreground/background detecting unit 324. The threshold adjusting unit 322 dynamically sets a fourth threshold value and a fifth threshold value according to the region confidence CR_CONF.

The foreground/background detecting unit 324 compares the fourth threshold value with an overall difference between the region motion vector MV_R and the motion vectors of the pixels within a search window corresponding to the target pixel. Taking the search window of {−3,3} as an example, the foreground/background detecting unit 324 respectively compares the region motion vector MV_R with the motion vectors MV_P of seven pixels within the search window, and obtains the individual differences according to the comparison results. If the sum of the individual differences is smaller than the fourth threshold value, then the target pixel may be regarded as the foreground pixel. If the sum of the individual differences is greater than the fourth threshold value, then the target pixel may be regarded as the background pixel.

In addition, the foreground/background detecting unit 324 may also perform comb detection on the target pixel according to the fifth threshold value to prevent the background pixel from being incorrectly adopting the region motion vector MV_R to perform the motion compensation interpolation. If the foreground/background detecting unit 324 has not detected the comb phenomenon, then the target pixel may be regarded as the foreground pixel. If the foreground/background detecting unit 324 has detected the comb phenomenon, then the target pixel may be regarded as the background pixel. With regard to the foreground/background detecting unit 324, it is possible to adopt only one of the above-mentioned difference comparison and the comb detection to judge the target pixel as the foreground pixel or the background pixel.

However, the foreground/background detecting unit 324 may also adopt both of them. When the target pixel is judged as the foreground pixel, the foreground/background detecting unit 324 outputs the compensation select signal MCCU_SEL to the multiplexer 40 such that the multiplexer outputs the compensation pixel datum MCCU_OUT as the correlated pixel datum DATA_OUT of the target pixel. When the target pixel is judged as the background pixel, the foreground/background detecting unit 324 outputs the compensation select signal MCCU_SEL to the multiplexer 40 such that the multiplexer outputs the de-interlacing pixel datum DEI_OUT as the correlated pixel datum DATA_OUT of the target pixel.

The motion compensation block 330 performs the motion compensation according to at least a part of the correlated fields and the region motion vector MV_R when the target pixel belongs to the caption region, and judges whether the detection line, to which the target pixel belongs, is a pull-down caption line to obtain the compensation pixel datum MCCU_OUT of the target pixel. The motion compensation block 330 includes a motion compensation unit 332 and a pull-down caption correction unit 334.

The motion compensation unit 332 performs the motion compensation on the target pixel to obtain an interpolation pixel datum PO1 according to the previous field pre, the next field nxt and the region motion vector MV_R when the target pixel belongs to the caption region. If the region motion vector MV_R is an even vector, then a median of two pixel data having one half of the region motion vector (MV_R)/2 with respect to the target pixel is taken to obtain the interpolation pixel datum PO1.

Figure 5:
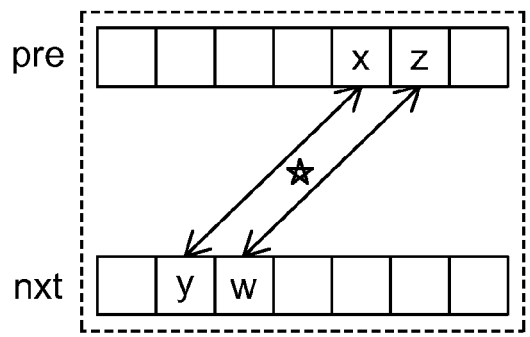
FIG. 5 is a schematic illustration showing an example of motion compensation according to the preferred embodiment of the invention.

If the region motion vector MV_R is an odd vector, then the condition will be illustrated with reference to FIG. 5. FIG. 5 is a schematic illustration showing an example of motion compensation according to the preferred embodiment of the invention. As shown in FIG. 5, symbol ☆ represents the target pixel, symbols x and z represent the pixels of the previous field pre, and symbols y and w represent the pixels of the next field nxt. The motion compensation unit 332 takes an average of the pixels x and y, the average of the pixels z and w and the average of the pixels x, y, z and w to perform the comb detection. If the difference between the average of the pixels x and y and the average of the pixels z and w is too great, then the target pixel is regarded as the background pixel. Otherwise, the minimum comb phenomenon caused by one of the three averages is taken as the interpolation pixel datum PO1.

The pull-down caption correction unit 334 judges whether the detection line, to which the target pixel belongs, is the pull-down caption line or not to determine whether to perform the pull-down caption correction on the target pixel. If the detection line, to which the target pixel belongs, is judged as the pull-down caption line, such as a theater video/film type of 3:2 pull-down caption line or 2:2 pull-down caption line, then the pull-down caption correction unit 334 obtains and outputs a pull-down caption correction result as the compensation pixel datum MCCU_OUT according to the conventional de-interlacing manner for the pull-down film sequences and based on the previous field pre and the next field nxt. If the detection line, to which the target pixel belongs, is judged as not the pull-down caption line, then the pull-down caption correction unit 334 outputs the motion compensation result PO1 of the target pixel as the compensation pixel datum MCCU_OUT.

In addition, if the target pixel does not belong to the caption region, then the motion compensation unit 332 obtains the value of the interpolation pixel datum PO1, which is "X" (don't care), according to previous field pre, the next field nxt and the region motion vector MV_R. At this time, the pull-down caption correction unit 334 outputs the interpolation pixel datum PO1 as the compensation pixel datum MCCU_OUT. That is, the value of the compensation pixel datum MCCU_OUT is also "X" (don't care). Therefore, when the moving caption compensator 30 operates independently and the target pixel does not belong to the caption region, the value outputted from the moving caption compensator 30 is "X" (don't care), and may be regarded as disabled.

Figure 6:
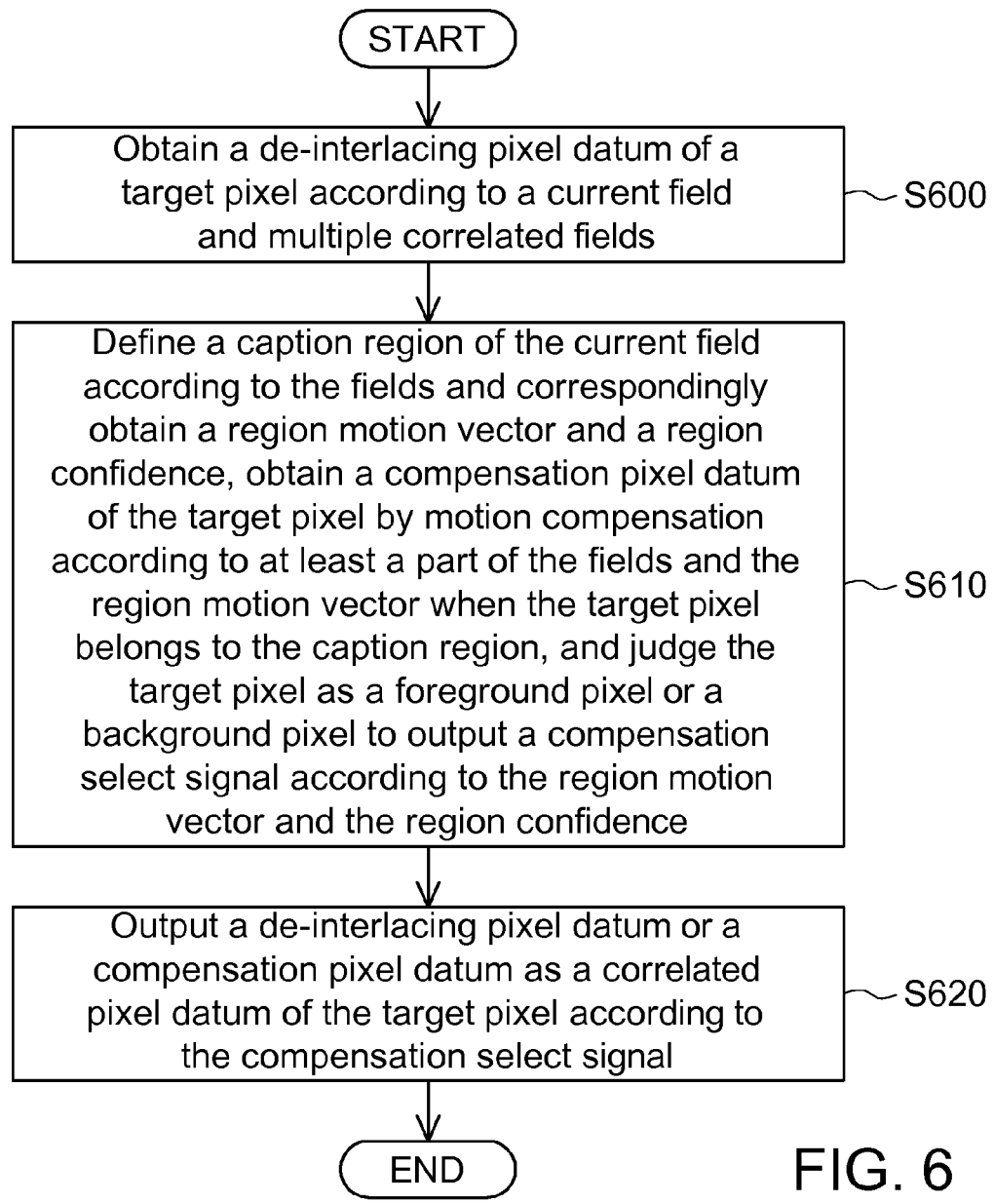
FIG. 6 is a flow chart showing a de-interlacing method according to the preferred embodiment of the invention.

The invention also provides a de-interlacing method. FIG. 6 is a flow chart showing a de-interlacing method according to the preferred embodiment of the invention. In step S600, a de-interlacing pixel datum of a target pixel is obtained according to a current field and multiple correlated fields. In step S610, a caption region of the current field is defined according to the fields, and a region motion vector and a region confidence are correspondingly obtained. In addition, when the target pixel belongs to the caption region, a compensation pixel datum of the target pixel is obtained by motion compensation according to at least a part of the fields and the region motion vector, and the target pixel is judged as a foreground pixel or a background pixel to output a compensation select signal according to the region motion vector and the region confidence. In step S620, the de-interlacing pixel datum or the compensation pixel datum is outputted as a correlated pixel datum of the target pixel according to the compensation select signal.

Figure 7:
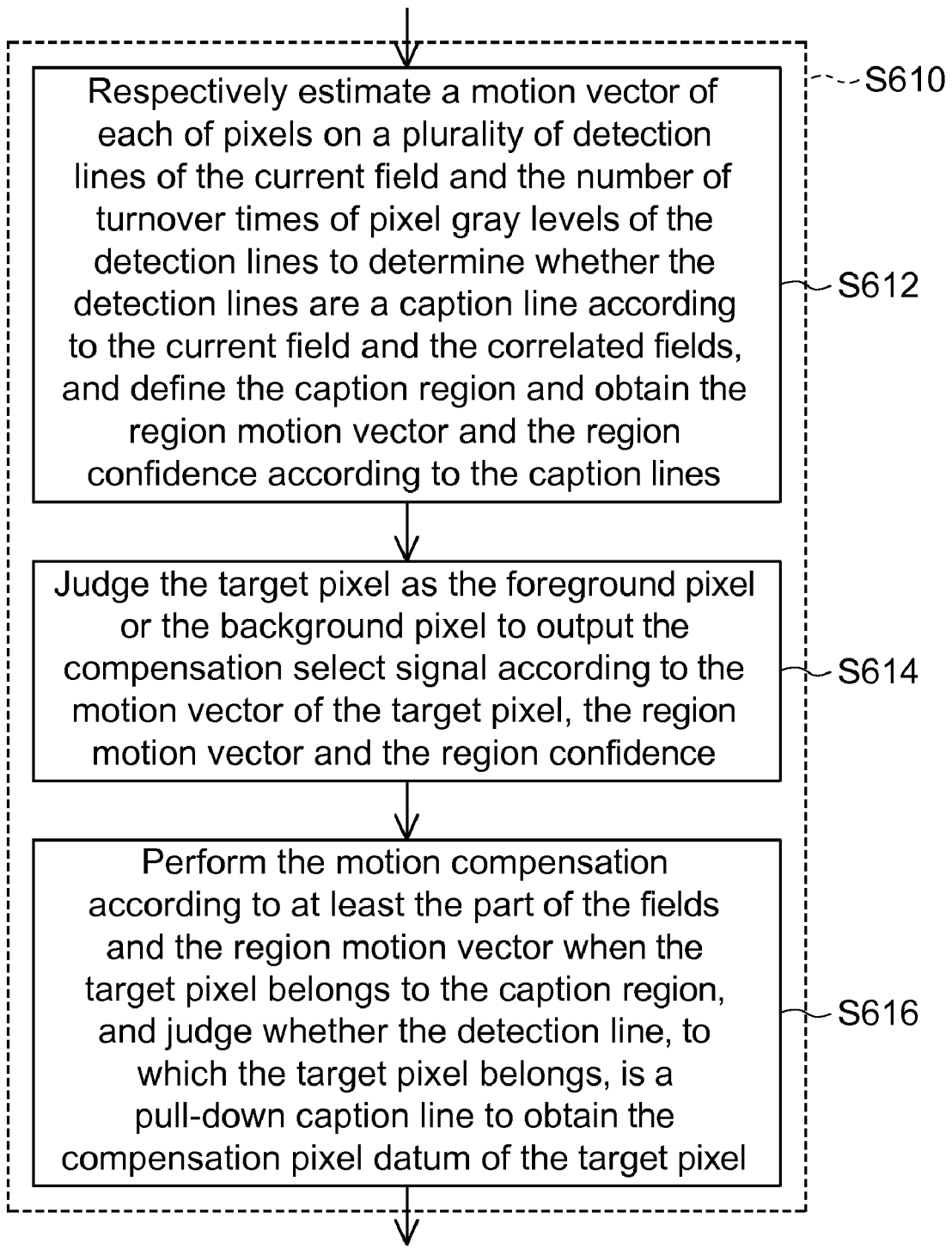
FIG. 7 is a detailed flow chart showing the step S610 of the de-interlacing method according to the preferred embodiment of the invention.

FIG. 7 is a detailed flow chart showing the step S610 of the de-interlacing method according to the preferred embodiment of the invention. In step S612, a motion vector of each of pixels on a plurality of detection lines of the current field and the number of turnover times of pixel gray levels of the detection lines are respectively estimated to determine whether the detection lines are caption lines according to the current field and the correlated fields, and the caption region is defined and the region motion vector and the region confidence are obtained according to the caption lines. In step S614, the target pixel is judged as the foreground pixel or the background pixel to output the compensation select signal according to the motion vector of the target pixel, the region motion vector and the region confidence. In step S616, when the target pixel belongs to the caption region, the motion compensation is performed according to at least one part of the fields and the region motion vector, and it is judged whether the detection line, to which the target pixel belongs, is a pull-down caption line to obtain the compensation pixel datum of the target pixel.

The detailed principles of the de-interlacing method have been mentioned in the descriptions of the de-interlacing apparatus 10, so detailed descriptions thereof will be omitted.

The de-interlacing apparatus and method and the moving caption compensator according to the embodiment of the invention have many advantages, some of which will be listed in the following.

In the de-interlacing apparatus and method and the moving caption compensator according to the invention, multiple correlated fields are adopted to estimate the motion vector and the number of turnover times of the pixel gray levels of the detection lines of each pixel on the detection lines, and it is judged whether the detection lines are effective caption lines and the most probable motion vectors thereof are obtained. Then, the caption region constituted by multiple detection lines is defined according to the properties of the neighboring caption lines, the caption confidence of the whole image is estimated according to the confidence of all the caption lines in the whole image, and the motion compensation is performed on the pixels in the caption region. Then, the correlated pixel datum is obtained according to whether the pixel belongs to the foreground pixel or the background pixel. As regard to the theater video/film type pull-down motion caption, the pull-down caption detection may be performed to provide the suitable motion vector.

In addition, in the de-interlacing apparatus and method and the moving caption compensator according to the invention, it is firstly determined whether the target pixel belongs to the foreground pixel or the background pixel. If the target pixel is a foreground pixel, the motion compensation is performed by inter-field interpolation in the temporal direction according to the estimated motion vector. If the target pixel is the background pixel, other existing de-interlacing methods, including the moving adaptive method, or the motion compensation method, may be performed for the compensation. So, the de-interlacing apparatus and method and the moving caption compensator according to the invention can de-interlace the whole image and perform the motion compensation on the motion caption. Consequently, it is possible to decrease many poor visual effects, such as flicker, line jitter and non-smoothness, so that the better de-interlaced image frame may be obtained.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A de-interlacing apparatus, comprising:
    a de-interlacer for obtaining a de-interlacing pixel datum of a target pixel according to a current field and a plurality of correlated fields;
    a moving caption compensator for defining a caption region of the current field according to the fields and correspondingly obtaining a region motion vector and a region confidence, wherein when the target pixel belongs to the caption region, the moving caption compensator obtains a compensation pixel datum of the target pixel by motion compensation according to at least a part of the fields and the region motion vector, and judging the target pixel as a foreground pixel or a background pixel to output a compensation select signal according to the region motion vector and the region confidence; and
    a multiplexer controlled by the compensation select signal to output the de-interlacing pixel datum or the compensation pixel datum as a correlated pixel datum of the target pixel.

2. The apparatus according to claim 1, wherein the moving caption compensator comprises:
    a caption region defining block for respectively estimating a motion vector of each of pixels on a plurality of detection lines of the current field and the number of turnover times of pixel gray levels on the detection lines to determine whether the detection lines are caption lines according to the current field and the correlated fields, and defining the caption region according to the caption lines and obtaining the region motion vector and the region confidence;
    a foreground/background judging block for judging the target pixel as the foreground pixel or the background pixel to output the compensation select signal according to the motion vector of the target pixel, the region motion vector and the region confidence; and
    a motion compensation block for performing the motion compensation according to at least a part of the fields and the region motion vector when the target pixel belongs to the caption region, and judging whether the detection line, to which the target pixel belongs, is a pull-down caption line or not to obtain the compensation pixel datum of the target pixel.

3. The apparatus according to claim 2, wherein each of the detection lines corresponds to one scan line.

4. The apparatus according to claim 2, wherein each of the detection lines corresponds to one data line.

5. The apparatus according to claim 2, wherein the caption region defining block comprises:
    a turnover detecting unit for detecting the number of turnover times of the pixel gray levels of the detection lines of the current field;
    a motion estimating unit for respectively estimating the motion vector of each of the pixels on the detection lines according to the current field and the correlated fields;
    a caption line detecting unit for respectively judging whether the detection lines are the caption line or not according to the number of turnover times of the pixel gray levels and the motion vector of each of the pixels on the detection lines, and obtaining a plurality of most probable motion vectors corresponding to the detection lines, respectively; and
    a caption region detecting unit for defining the caption region according to the caption lines and obtaining the region confidence of the caption region, and obtaining the region motion vector according to the most probable motion vectors.

6. The apparatus according to claim 5, wherein the motion estimating unit calculates cross differences between pixel gray levels in a plurality of directions within a search window between two parity-fields in the current field and the correlated fields with respect to each of pixels on the detection lines, and takes a minimum of the cross differences between the pixel gray levels corresponding to each of the pixels as the motion vector of the pixel.

7. The apparatus according to claim 6, wherein the minimum of the cross differences between the pixel gray levels is smaller than a first threshold value.

8. The apparatus according to claim 5, wherein when the number of turnover times of the pixel gray levels of the detection line is greater than a second threshold value and a mode of the motion vectors of the pixels on the detection line is greater than a third threshold value, the caption line detecting unit judges the detection line as the caption line, and takes the mode as the most probable motion vector of the detection line.

9. The apparatus according to claim 8, wherein the most probable motion vector is a non-zero vector.

10. The apparatus according to claim 5, wherein the caption region detecting unit defines the caption region according to the caption lines of the current field and a previous field of the correlated fields, and obtains the region motion vector according to the most probable motion vectors.

11. The apparatus according to claim 5, wherein the caption region detecting unit defines the caption region according to the caption lines of the current field, and obtains the region motion vector according to the most probable motion vectors.

12. The apparatus according to claim 5, wherein the caption region detecting unit obtains the region confidence of the caption region according to the number of pixels having the most probable motion vectors on the detection lines in the caption region.

13. The apparatus according to claim 2, wherein the foreground/background judging block comprises:
a threshold adjusting unit for dynamically setting a fourth threshold value and a fifth threshold value according to the region confidence; and
a foreground/background detecting unit for comparing the fourth threshold value with an overall difference between the region motion vector and the motion vectors of the pixels within a search window corresponding to the target pixel, or for performing comb detection on the target pixel according to the fifth threshold value, to judge the target pixel as the foreground pixel or the background pixel and thus to output the compensation select signal.

14. The apparatus according to claim 2, wherein the motion compensation block comprises:
a motion compensation unit for performing the motion compensation on the target pixel according to at least one part of the fields, the region motion vector and the de-interlacing pixel datum when the target pixel belongs to the caption region; and
a pull-down caption correction unit for judging whether the detection line, to which the target pixel belongs, is the pull-down caption line or not to determine whether to perform a pull-down caption correction on the target pixel, and outputting a motion compensation result of the target pixel as the compensation pixel datum if the detection line, to which the target pixel belongs, is not the pull-down caption line, or otherwise outputting a pull-down caption correction result of the target pixel as the compensation pixel datum.

15. A moving caption compensator, comprising:
a caption region defining block for respectively estimating a motion vector of each of pixels on a plurality of detection lines of a current field and the number of turnover times of pixel gray levels of the detection lines according to the current field and the plurality of correlated fields to determine whether the detection lines are caption lines, and defining a caption region according to the caption lines and correspondingly obtaining a region motion vector and a region confidence;
a foreground/background judging block for judging a target pixel as a foreground pixel or a background pixel to output a compensation select signal according to a motion vector of the target pixel, the region motion vector and the region confidence; and
a motion compensation block for performing, when the target pixel belongs to the caption region, motion compensation according to at least a part of the fields and the region motion vector, and judging whether the detection line, to which the target pixel belongs, is a pull-down caption line or not to obtain a compensation pixel datum of the target pixel.

16. The compensator according to claim 15, wherein each of the detection lines corresponds to one scan line.

17. The compensator according to claim 15, wherein each of the detection lines corresponds to one data line.

18. The compensator according to claim 15, wherein the caption region defining block comprises:
a turnover detecting unit for detecting the number of turnover times of the pixel gray levels of the detection lines of the current field;
a motion estimating unit for respectively estimating the motion vector of each of the pixels on the detection lines according to the current field and the correlated fields;
a caption line detecting unit for respectively judging whether the detection lines are the caption line or not according to the number of turnover times of the pixel gray levels and the motion vector of each of the pixels on the detection lines, and obtaining a plurality of most probable motion vectors corresponding to the detection lines, respectively; and
a caption region detecting unit for defining the caption region according to the caption lines and obtaining the region confidence of the caption region, and obtaining the region motion vector according to the most probable motion vectors.

19. The compensator according to claim 18, wherein the motion estimating unit calculates cross differences between pixel gray levels in a plurality of directions within a search window between two parity-fields in the current field and the correlated fields with respect to each of pixels on the detection lines, and takes a minimum of the cross differences between the pixel gray levels corresponding to each of the pixels as the motion vector of the pixel.

20. The compensator according to claim 19, wherein the minimum of the cross differences between the pixel gray levels is smaller than a first threshold value.

21. The compensator according to claim 18, wherein when the number of turnover times of the pixel gray levels of the detection line is greater than a second threshold value and a mode of the motion vectors of the pixels on the detection line is greater than a third threshold value, the caption line detecting unit judges the detection line as the caption line, and takes the mode as the most probable motion vector of the detection line.

22. The compensator according to claim 21, wherein the most probable motion vector is a non-zero vector.

23. The compensator according to claim 18, wherein the caption region detecting unit defines the caption region according to the caption lines of the current field and a previous field of the correlated fields, and obtains the region motion vector according to the most probable motion vectors.

24. The compensator according to claim 18, wherein the caption region detecting unit defines the caption region according to the caption lines of the current field, and obtains the region motion vector according to the most probable motion vectors.

25. The compensator according to claim 18, wherein the caption region detecting unit obtains the region confidence of the caption region according to the number of pixels having the most probable motion vectors on the detection lines in the caption region.

26. The compensator according to claim 15, wherein the foreground/background judging block comprises:
a threshold adjusting unit for dynamically setting a fourth threshold value and a fifth threshold value according to the region confidence; and
a foreground/background detecting unit for comparing the fourth threshold value with an overall difference between the region motion vector and the motion vectors of the pixels within a search window corresponding to the target pixel, or for performing comb detection on the target pixel according to the fifth threshold value to judge the target pixel as the foreground pixel or the background pixel and thus to output the compensation select signal.

27. The compensator according to claim 15, wherein the motion compensation block comprises:
a motion compensation unit for performing the motion compensation on the target pixel according to at least one part of the fields and the region motion vector when the target pixel belongs to the caption region; and
a pull-down caption correction unit for judging whether the detection line, to which the target pixel belongs, is the pull-down caption line or not to determine whether to perform a pull-down caption correction on the target pixel, and outputting a motion compensation result of the target pixel as the compensation pixel datum if the detection line, to which the target pixel belongs, is not the pull-down caption line, or otherwise outputting a pull-down caption correction result of the target pixel as the compensation pixel datum.

28. A de-interlacing method, comprising:
obtaining a de-interlacing pixel datum of a target pixel according to a current field and a plurality of correlated fields;
defining a caption region of the current field according to the fields and correspondingly obtaining a region motion vector and a region confidence;
obtaining, when the target pixel belongs to the caption region, a compensation pixel datum of the target pixel by motion compensation according to at least a part of the fields and the region motion vector, and judging the target pixel as a foreground pixel or a background pixel to output a compensation select signal according to the region motion vector and the region confidence; and
outputting the de-interlacing pixel datum or the compensation pixel datum as a correlated pixel datum of the target pixel according to the compensation select signal.

29. The method according to claim 28, further comprising:
respectively estimating a motion vector of each of pixels on a plurality of detection lines of the current field and the number of turnover times of pixel gray levels on the detection lines to determine whether the detection lines are caption lines according to the current field and the correlated fields, and defining the caption region according to the caption lines and obtaining the region motion vector and the region confidence;
judging the target pixel as the foreground pixel or the background pixel to output the compensation select signal according to the motion vector of the target pixel, the region motion vector and the region confidence; and
performing the motion compensation according to at least one part of the fields and the region motion vector when the target pixel belongs to the caption region, and judging whether the detection line, to which the target pixel belongs, is a pull-down caption line or not to obtain the compensation pixel datum of the target pixel.

30. The method according to claim 29, wherein each of the detection lines corresponds to one scan line.

31. The method according to claim 29, wherein each of the detection lines corresponds to one data line.

32. The method according to claim 29, further comprising:
detecting the number of turnover times of the pixel gray levels of the detection lines of the current field;
respectively estimating the motion vector of each of the pixels on the detection lines according to the current field and the correlated fields;
respectively judging whether the detection lines is the caption line or not according to the number of turnover times of the pixel gray levels and the motion vector of each of the pixels on the detection lines, and obtaining a plurality of most probable motion vectors corresponding to the detection lines, respectively; and
defining the caption region according to the caption lines and obtaining the region confidence of the caption region, and obtaining the region motion vector according to the most probable motion vectors.

33. The method according to claim 32, further comprising:
calculating cross differences between pixel gray levels in a plurality of directions within a search window between two parity-fields in the current field and the correlated fields with respect to each of pixels on the detection lines, and taking a minimum of the cross differences between the pixel gray levels corresponding to each of the pixels as the motion vector of the pixel.

34. The method according to claim 33, wherein the minimum of the cross differences between the pixel gray levels is smaller than a first threshold value.

35. The method according to claim 32, further comprising:
judging, when the number of turnover times of the pixel gray levels of the detection line is greater than a second threshold value and a mode of the motion vectors of the pixels on the detection line is greater than a third threshold value, the detection line as the caption line, and taking the mode as the most probable motion vector of the detection line.

36. The method according to claim 35, wherein the most probable motion vector is a non-zero vector.

37. The method according to claim 32, further comprising:
defining the caption region according to the caption lines of the current field and a previous field of the correlated fields, and obtaining the region motion vector according to the most probable motion vectors.

38. The method according to claim 32, further comprising:
defining the caption region according to the caption lines of the current field, and obtaining the region motion vector according to the most probable motion vectors.

39. The method according to claim 32, further comprising:
obtaining the region confidence of the caption region according to the number of pixels having the most probable motion vectors on the detection lines in the caption region.

40. The method according to claim 29, further comprising:
dynamically setting a fourth threshold value and a fifth threshold value according to the region confidence; and
comparing the fourth threshold value with an overall difference between and the region motion vector and the motion vectors of the pixels within a search window corresponding to the target pixel, or performing comb detection on the target pixel according to the fifth threshold value to judge the target pixel as the foreground pixel or the background pixel and thus to output the compensation select signal.

41. The method according to claim 29, further comprising:
performing the motion compensation on the target pixel according to at least one part of the fields, the region motion vector and the de-interlacing pixel datum when the target pixel belongs to the caption region;
judging whether the detection line, to which the target pixel belongs, is the pull-down caption line or not to determine whether to perform a pull-down caption correction on the target pixel; and
outputting a motion compensation result of the target pixel as the compensation pixel datum if the detection line, to which the target pixel belongs, is not the pull-down caption line, or otherwise outputting a pull-down caption correction result of the target pixel as the compensation pixel datum.

* * * * *